(12) United States Patent
Abramov et al.

(10) Patent No.: US 7,916,912 B2
(45) Date of Patent: Mar. 29, 2011

(54) EFFICIENT BORDER EXTRACTION OF IMAGE FEATURE

(75) Inventors: Menahem Abramov, Jerusalem (IL); Philippe Nathan Bamberger, Jerusalem (IL)

(73) Assignee: Siemens Israel Ltd., Jerusalem (IL)

( * ) Notice: Subject to any disclaimer, the term of this patent is extended or adjusted under 35 U.S.C. 154(b) by 869 days.

(21) Appl. No.: 11/852,541

(22) Filed: Sep. 10, 2007

(65) Prior Publication Data

US 2008/0069421 A1    Mar. 20, 2008

Related U.S. Application Data

(60) Provisional application No. 60/844,378, filed on Sep. 14, 2006.

(51) Int. Cl.
*G06K 9/00*    (2006.01)
*A61B 6/04*    (2006.01)
(52) U.S. Cl. ............................ 382/128; 382/274; 378/37
(58) Field of Classification Search .................. 382/128, 382/129, 130, 131, 132, 133, 134, 162, 164, 382/168, 181, 193, 194, 199, 232, 254, 260, 382/263, 274, 276, 291, 305, 312; 378/4, 378/16, 18, 28, 37
See application file for complete search history.

(56) References Cited

U.S. PATENT DOCUMENTS

| | | | | |
|---|---|---|---|---|
| 5,982,917 | A * | 11/1999 | Clarke et al. | 382/132 |
| 6,956,975 | B2 * | 10/2005 | Young | 382/263 |
| 7,272,265 | B2 * | 9/2007 | Kouri et al. | 382/260 |
| 7,616,818 | B2 * | 11/2009 | Dewaele | 382/199 |
| 2006/0013455 | A1 * | 1/2006 | Watson et al. | 382/128 |
| 2006/0147101 | A1 * | 7/2006 | Zhang et al. | 382/131 |
| 2008/0152220 | A1 * | 6/2008 | Shi et al. | 382/164 |

OTHER PUBLICATIONS

Zhou et al., "Computerized Image Analysis: Estimation of Breast Density on Mammograms", Medical Physics, AIP, Melville, NY, US, vol. 28, No. 6, Jun. 1, 2001, pp. 1056-1069.
Low, "Introductory Computer Vision and Image Processing", 1991, McGraw-Hill Book Company, England, pp. 97-99.
Davis, "A Survey of Edge Detection Techniques", Computer Graphics and Image Processing, Academic Press, New York, US, vol. 4, No. 3, Sep. 1, 1975, pp. 248-270.
International Search Report including Notification of Transmittal of the International Search Report, International Search Report, and Written Opinion of the International Searching Authority.

* cited by examiner

*Primary Examiner* — Seyed Azarian (57) ABSTRACT

Method of segmenting mammography image comprising steps of: scanning along row from outermost pixel towards the breast and comparing grayscale gradient across adjacent pixels until a significant gradient is determined; confirming that variation in gradient indicates a first true boundary pixel by ascertaining gradient across subsequent pixels is still significant;
iteratively repeating steps of:
  (i) scanning next adjacent line in vicinity of boundary pixel, and
  (ii) determining the boundary pixel of adjacent line by variation in grayscale intensity gradient along row
  (iii) until failure to find subsequent pixel occurs and
  (iv) attempting scanning horizontally by repeating steps (i) and (ii), and, if attempt fails, extrapolating to edge of image or to first line,
  until having determined boundary around the feature to one side of first line;
repeating steps (i) to (iv) on other side of line until boundary of breast on the other side of the line is determined.

24 Claims, 8 Drawing Sheets

FIG.6B

EFFICIENT BORDER EXTRACTION OF IMAGE FEATURE

PRIORITY

This application claims priority from U.S. Provisional Application Ser. No. 60/844,378 filed on Sep. 14, 2006.

FIELD OF THE INVENTION

The present invention is directed to image analysis, specifically to locating the boundary of a feature in an image, such as of specific tissue type in an X-ray image, particularly but not exclusively for breast segmentation of a digital mammography image.

BACKGROUND OF THE INVENTION

For many image analysis applications it is necessary to identify the boundary of features shown in an image. Particularly in medical imaging, such as X-ray images of lungs or breasts for diagnosing cancerous tumors and the like, it is essential to identify the boundary of the lung lobe or breast tissue.

More than 10% of women in the western world contract breast cancer, and the success and ease of treatment is highly dependent on early diagnosis. Mammography is the use of low-dose x-ray radiation to image the tissue inside the breast. The technique is used to screen for and diagnose breast cancer by detecting tumors or other changes in breast tissue and aids in early detection of malignant tumors, which improves chances of successful treatment. It can identify abnormalities before a lump can be felt and provides the only reliable method of locating abnormal growths in the milk ducts. Thus it may facilitate locating suspected tumors, prior to a biopsy or surgery.

In consequence of the dangers of breast cancer and the success of mammography, the guidelines laid by the U.S. Department of Health and Human Services (HHS), the American Cancer Society (ACS), the American Medical Association (AMA) and the American College of Radiology (ACR) recommend that screening mammograms be performed annually for all women over the age of 40 in good health, with annual mammograms being advisable at earlier ages for women with a family history of breast cancer or having had prior breast biopsies.

In mammography, the breast is compressed between two plates and exposed to X-rays. Two pictures of each breast are generally taken during a screening mammogram, with extra images from different angles being sometimes necessary for women with breast implants. With so many scans requiring analysis, it is essential to automate the analysis as much as possible and to optimize the examination of the medical images, both by increased accuracy of the analysis and by faster processing times.

It is very important to detect the outer boundary of the breast to ensure that analysis of suspicious micro-features only occurs in genuine breast tissue and not in other parts of the chest, and that the whole of the breast tissue is included in the analysis. An exact definition of the breast area, generally known as breast segmentation, is required for optimal usage of the X-ray images obtained by digital mammography, in particular for soft display on a monitor and for computer aided diagnosis (CAD). Accurate breast segmentation allows for analyzing all the breast tissue while minimizing processing time and avoiding the generation of false marks outside the breast. In particular, it will be noted that accurate breast segmentation allows for optimally enlarging the image without cutting out any breast tissue.

Breast segmentation is not trivial however. Since the size of the breast is highly variable between women, the thickness of the imaged compressed tissues differs significantly between subjects. The tissue composition of the breast is also highly variable and therefore the average absorption of X-rays by the breast tissue varies significantly between women.

Since the density, size and texture of breasts are so very variable, determination of the boundary of the breast in x-ray images is not easy and current algorithms are time consuming and expensive in terms of the computer power required.

Digital mammography is preferably to conventional film in that better contrast is available. Digital mammogram images are stored as digital pictures which can be transmitted easily for remote consultation.

Compared to other anatomical regions, the breast has very low physical contrast because it is composed completely of soft tissues. In general, the breast consists of a background of fat surrounding the slightly denser, glandular structures and pathologic tissues or cysts if they are present. Typical breast calcifications are very small and thin and produce low physical contrast despite calcium being somewhat denser and having a higher atomic number than the elements of soft tissues.

Mammography is generally performed with a spectrum containing photons within a relatively narrow energy range (19 keV-21 kev) in an attempt to obtain high contrast with minimal dosage. The spectrum is produced using the characteristic radiation from a molybdenum anode x-ray tube and filtered by either a molybdenum or a rhodium filter.

The molybdenum anode, molybdenum filter system is quite good for general mammography in that it provides a spectrum that is very close to the optimum spectrum for smaller and less dense breasts. Many mammography machines give the operator the opportunity of selecting between molybdenum and rhodium filters, the latter being useful when imaging denser breasts.

Some systems have dual track anodes so that either molybdenum or rhodium can be selected as the anode material. Because of its higher atomic number (Z) rhodium produces characteristic x-radiation with higher energies than molybdenum. When the rhodium anode is selected, the beam penetration is increased. Generally, this produces better results when imaging dense breast. Since the physical parameters of X-ray sources used for mammography vary between different systems, a high variability is introduced between mammography images which is an artifact of the imaging parameters and not a result of different physiologies.

Although the magnification, brightness, contrast and orientation can be altered in digital X-ray images to display the breast tissue more clearly, such image enhancement techniques are required to be extensively automated by simple procedures to enable fast and accurate diagnosis.

The problem of breast segmentation has been extensively addressed in the prior art, and various methods have been proposed. Current methods are based mainly on grey level thresholding as described by Bick et al. in U.S. Pat. No. 5,452,367). Sometimes this technique is used in conjunction with local gradient methods such as described in U.S. Pat. No. 5,572,565 to Abdel-Mottaleb, for example.

U.S. Pat. No. 5,825,910 to Vafai describes the use of local gradient methods as a refinement after coarse breast segmentation. Such methods make it very difficult to precisely include all tissue, especially the peripheral skin or other border areas having low tissue density.

There is thus a need for methods of image analysis for extracting the boundary of features, particularly for medical image analysis and most particularly for the demanding and critical application of breast segmentation for mammography, and the present invention addresses this need.

SUMMARY OF THE INVENTION

The present invention is directed to providing improved methods of establishing the outer boundary of features in images in general, such as the boundary of breast tissue in X-ray mammography images, for example.

A first aspect of the invention is directed to a method of determining boundary pixels of a feature in a digital picture provided to a computer, the digital picture comprising a two dimensional orthogonal array of lines of adjacent pixels, the method comprising the steps of:
(b) scanning a first line across the picture in a first direction from an outermost pixel of the picture towards the feature and calculating grayscale gradient across adjacent pixels until a significant gradient is determined;
(c) confirming that the variation in grayscale gradient across adjacent pixels indicates a first true boundary pixel of the feature by ascertaining that grayscale gradient across subsequent pixels in a series of several pixels along the line is still significant;
(d) iteratively repeating the steps (v) to (vi) of:
   (v) scanning next adjacent line in vicinity of said boundary pixel, and
   (vi) determining the boundary pixel of the adjacent line by assessing the significance of grayscale intensity gradient along the row until a failure to find a subsequent pixel occurs in which case
   (vii) attempt scanning in an orthogonal direction by repeating steps (v) and (vi), and, if attempt fails, extrapolating to edge of image or to first line,
   until having determined the boundary around the feature to one side of the first line;
(e) repeating step (d) on other side of the line until the boundary around the feature on the other side of the line is determined.

Typically, the digital image is a monochrome image.

In preferred embodiments, the method further comprises the preliminary step (a) of preprocessing by normalizing intensities of all pixels in the picture.

In one embodiment, the step of normalizing comprises the sub-steps of:
   (i) removing frame;
   (ii) setting brightest pixel in picture to a maximum intensity value of a simplified scale;
   (iii) setting dullest pixel to a background intensity value of the simplified scale, and
   (iv) converting intensities of intermediate intensity pixels to intermediate values of the simplified scale.

Optionally, the preliminary step (a) of preprocessing comprises normalizing intensities via a logarithmic scale.

In a specific embodiment, the preliminary step (a) of preprocessing comprises the steps of:
   i. sampling the digital picture with an integer coefficient to produce a sampled image having a reduced resolution;
   ii. computing a raw image histogram from the sampled image;
   iii. where digital image is framed, identifying and removing frame from the sampled image to produce a clean image;
   iv. selecting most intense pixel and least intense pixel from said clean image histogram;
   v. setting grey-scales of least intense and most intense pixels to standardized minimum and maximum arbitrary values;
   vi. creating a look-up-table (LUT) for transforming grayscales of pixels with intermediate intensities by calculating a logarithmic scale between said maximum and minimum intensities;
   vii. applying said LUT to the clean image to produce a normalized image.

Typically, the sampled image is a 16-bit positive image and said LUT converts the sampled image into an 8 bit image.

Optionally, step (c) of confirming that the variation in adjacent pixels indicates a first true boundary pixel of the feature by the steps of:
   i. determining a reference gradient range;
   ii. determining a minimum and a maximum line segment length;
   iii. setting line segment to its minimum length
   iv. calculating local average of grayscale values at each pixel within the line segment adjacent to said border pixel;
   v. calculating the local grayscale gradient at said boundary pixel; such that
   vi. if the local gradient is not within the reference gradient range then the boundary pixel is moved to the end of the line-segment and steps iii, iv and v are repeated;
   vii. if the local gradient is within the reference gradient range and the line segment length is below the maximum segment length, then the segment length is increased and steps (iv) and (v) are repeated;
   viii. if the local gradient is within the reference gradient range and the line segment length is not below the maximum segment length then the boundary pixel is validated.

The method may include the additional step (f) of restoring the original resolution of the digital picture and smoothing the border of the feature.

Typically, the digital image is an X-ray photograph.

Typically, the feature is a body tissue, optionally selected from the list comprising breast, lung, brain, colon and bone tissue.

Most typically, the feature is a breast and said method of determining border pixels is for segmenting the breast from surrounding tissue.

Where the feature is a breast, the line is typically a horizontal row of adjacent pixels across the breast image from side to side and the orthogonal direction is a column of adjacent pixels perpendicular to the row.

Where the picture is a DICOM image, the method may further include a step (a) of preprocessing to standardize presentation of the image wherein said step of preprocessing includes creating a logarithmic look-up table that is then applied for obtaining an image reflecting the dynamics of energy absorption.

In a second aspect, the present invention is directed to a system for mammography comprising:
   An XRAY source;
   a means of obtaining a digitalized X-Ray image of part of a female torso as a binary array;
   a computer configured to segmenting the digitalized image and identify pixels corresponding to border of a breast by a method comprising the steps of:
   (b) scanning a first horizontal row across the picture in a first direction from outermost pixel of picture towards the breast and calculating grayscale gradient across adjacent pixels until a gradient is detected as being significant;

(c) confirming that the variation in adjacent pixels indicates a first true boundary pixel of the feature by ascertaining that grayscale gradient across subsequent pixels in series of several pixels along the line is still significant;

(d) iteratively repeating the steps (v) to (vii) of:

(v) scanning next row in vicinity of said boundary pixel, and (vi) determining the boundary pixel of the adjacent row by assessing significant pixel intensity gradient along the row until a failure to find a predetermined significant gradient occurs in which case (vii) attempt scanning vertically by repeating steps (v) and (vi)

until the edge of picture is reached having segmentized the breast to one side of the first line, and (e) repeating step (d) on other side of the first row.

In preferred embodiments, the method comprises a preliminary step (a) of normalizing the image by the substeps of:

(i) removing any frame;

(ii) setting brightest pixel in picture to a maximum intensity value of a simplified scale;

(iii) setting dullest pixel to a background intensity value of the simplified scale, and (iv) converting intensities of intermediate intensity pixels to intermediate values of the simplified scale.

The method of the system may comprise the step (f) of restoring original resolution of the image and smoothing the boundary of the feature.

A third aspect of the invention is directed to a method of extracting a boundary surrounding a feature from a monochrome digital image comprising a two dimensional array of pixels, the method comprising the steps of:

(ii) scanning along a line of pixels in a first direction across the image from the outside edge of image towards the feature until a significant grayscale gradient occurs across a number of adjacent pixels;

(iii) ascertaining that the gradient indicates a true boundary pixel by evaluating the gradient across subsequent pixels;

(iv) identifying boundary pixels in an adjacent line by scanning grayscale intensity across pixels bordering the first boundary pixel;

(v) iteratively scanning next adjacent line to identify adjacent boundary pixels until technique fails;

(vi) rotating scanning direction to a direction orthogonal to the first direction;

(vii) repeating steps (ii) to (vi) until the first boundary pixel is reached after tracing a closed loop enclosing the feature or an edge of the image is reached.

The method may further comprise a preliminary step (i) of normalizing the image by the sub-steps of:

(a) removing any frame;

(b) setting brightest pixel in picture to a maximum intensity value of a simplified scale;

(c) setting dullest pixel to a background intensity value of the simplified scale, and (d) converting intensities of intermediate intensity pixels to intermediate values of the simplified scale.

The method may further comprise a subsequent step (viii) of restoring original resolution of the digital picture and smoothing the boundary of the feature.

A fourth aspect of the invention is directed to a method for preprocessing a raw digital image for subsequent segmentation of a feature therein comprising the steps of:

(i) removing any frame;

(ii) setting brightest pixel in picture to a maximum intensity value of a simplified scale;

(iii) setting dullest pixel to a background intensity value of the simplified scale, and (iv) converting intensities of intermediate intensity pixels to intermediate values of the simplified scale.

Preferably, the method of preprocessing a raw digital image for subsequent segmentation of a feature therein comprises the steps of:

a. sampling the digital picture with an integer coefficient to produce a sampled image having a reduced resolution;

b. computing a raw image histogram from the sampled image;

c. where digital image is framed, identifying and removing frame from the sampled image to produce a clean image;

d. selecting most intense pixel and least intense pixel from said clean image histogram;

e. setting grey-scales of least intense and most intense pixels to standardized minimum and maximum arbitrary values;

f. creating a look-up-table (LUT) for transforming grayscales of pixels with intermediate intensities by calculating a logarithmic scale between said maximum and minimum intensities;

g. applying said LUT to the clean image to produce a normalized image.

Optionally, the sampled image is a 16-bit positive image and said LUT converts the sampled image into an 8 bit image.

In a fifth aspect, the invention is directed to a method of confirming that the variation in grey level intensity of a suspected boundary pixel of a feature in an axial line across a digital image is a true boundary pixel of the feature comprising the steps of:

i. determining a reference gradient range;

ii. determining a minimum and maximum line segment length;

iii. scanning along the line towards feature;

iv. setting line segment to its minimum length;

v. calculating a local average of grayscale values about each pixel by averaging grayscale intensities of a line segment prior to and adjacent the pixel;

vi. calculating the local grayscale gradient at the boundary pixel; such that vii. if the local gradient is not within the reference gradient range then the suspected boundary pixel is moved to the end of the line-segment and steps iv and v are repeated;

viii. if the local gradient is within the reference gradient range and the line segment length is below the maximum segment length, then the segment length is increased and steps (v), (vi) and (vii) are repeated, and ix. if the local gradient is within the reference gradient range and the line segment length is not below the maximum segment length then the suspected boundary pixel is validated as being a true boundary pixel.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DESCRIPTION OF THE EMBODIMENTS

The present invention relates to determining the boundary or edge of a feature shown in an image. By way of example, the important and challenging field of breast segmentation is related to hereunder. It will be appreciated however, that the methodology disclosed herein is useful in other image analysis applications in general and medical imaging in particular.

Once the breast image is obtained, using mammography techniques as known, where the image is a digital image, a pre-processing method is first applied on the original Digital Imaging and COmmunication in Medicine (DICOM) image in order to standardize the image requiring breast segmentation. This preprocessing is essentially a normalization of the image so that contrast depends more on the physiology of the breast than on the imaging parameters.

After removal of the white border strips that are sometimes evident in such images, the minimum and maximum grey values (i.e. brightness) of the image are determined and a logarithmic look-up-table (LUT) is created, which is then used to obtain a transposed image that reflects the dynamics of energy absorption by the tissue thereby filtering out artifacts of the imaging technique such as specific equipment parameters, type of anode and filters used (Mo—Mo, Mo—Rh, Rh—Rh), energy of radiation, exposure times and the like.

The grayscale intensity variation in x-ray images has a logarithmic relationship to absorption in body tissues and thus for x-ray analysis in particular, a logarithmic normalization is desirable.

The spatial resolution of the image is then significantly reduced to save processing time; it being appreciated that the maximizing the throughput of mammography systems is critical to enable efficient screening of large numbers of women and to utilize resources effectively.

It is a particular feature of preferred embodiments of the present invention that feature boundary (contour) pixels are detected via a line-by-line approach. A first boundary pixel is first searched for by scanning a line across the middle of the image, starting from the background area toward the feature. For breast segmentation, it is preferable to scan along the horizontal rows across the middle of the breast.

From this first boundary (contour) pixel, a similar process is conducted iteratively to further construct the breast contour on adjacent image lines. This is done independently for the upper and lower parts of the breast. Toward the upper and lower limits of the breast image, taking into account the bow like, curved shape of the compressed breast, the scanning direction is usually switched from horizontal lines (i.e. rows) to vertical ones (i.e. columns).

To avoid artifacts, pixels are identified as being contour pixels only where a sufficient gradient of grey values is continuously observed along a minimal distance. When the breast segmentation process is completed, the breast contour may be returned to the resolution of the original image and smoothed.

A detailed description of a specific embodiment of the invention is now presented with reference to flowcharts 1, 2, 3, 5 and 6 which collectively illustrate an algorithm for segmenting digital mammography images.

Figure 1:
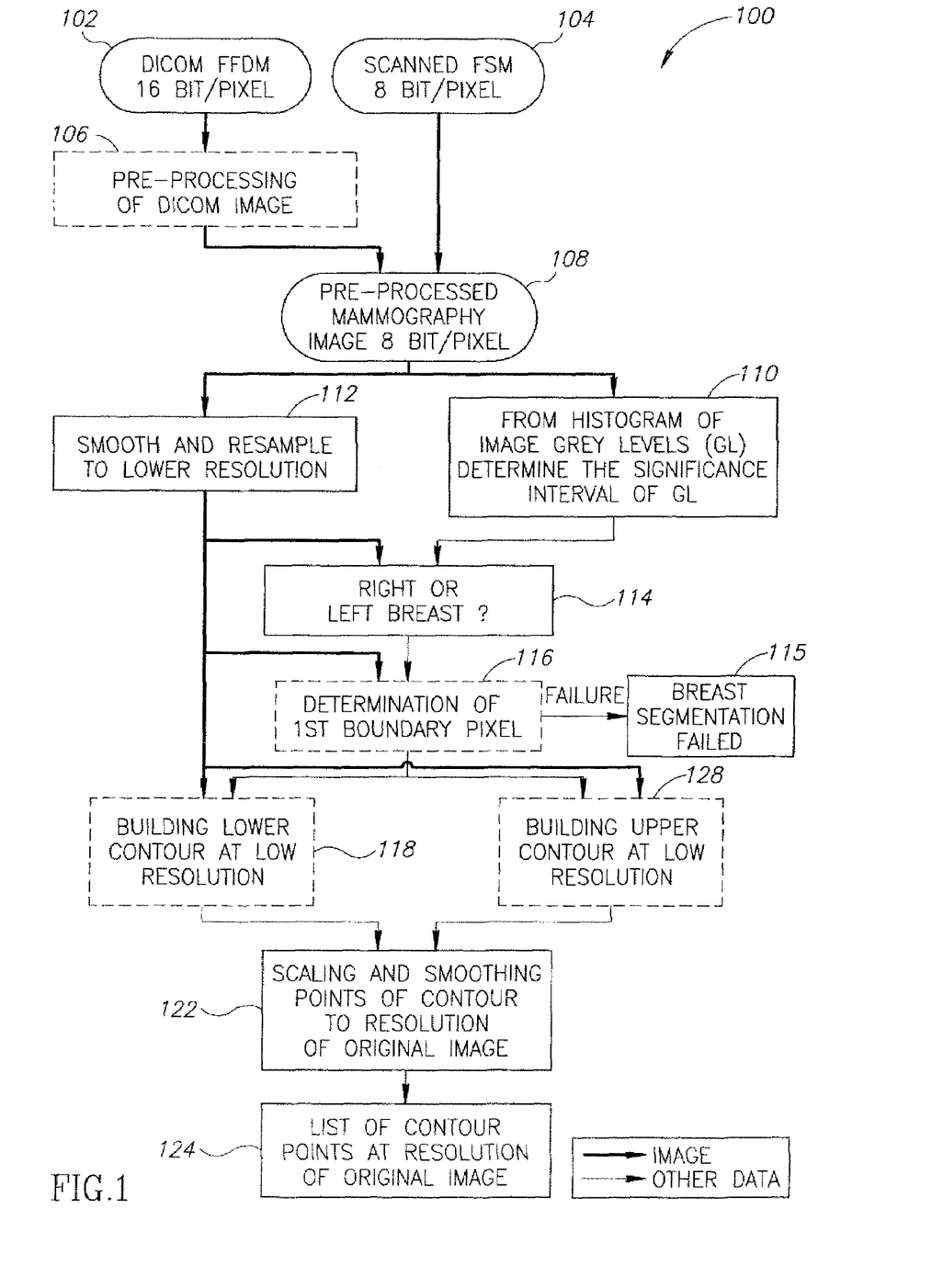
FIG. 1 shows a flowchart of the overall process for the segmentation of breast tissue according to an embodiment of the present invention.

With reference to FIG. 1 an overview 100 of the whole process in accordance with one embodiment is given. The raw input is typically a DICOM 16 bit/pixel image 102, such as that provided by a Full Field Digital Mammography system (FFDM). The range of shading variations in 16 bit/pixel images are far too detailed for breast segmentation purposes according to the methodology presented herein, and a preprocessing stage 106—detailed below with respect to FIG. 2—is used to convert the 16 bit DICOM image 102 into an 8 bit/pixel preprocessed mammography image 108 that can be segmented faster, leading to higher throughputs. Of course, if the raw data is, itself an 8 bit/pixel format Full Screen Mammography (FSM) image 104, the preprocessing stage (a) may be dispensed with.

A reference intensity gradient is determined for determining the border between breast tissue (higher intensity, brighter area) and surrounding background (lower intensity, duller area). This may be determined using a grayscale histogram 110. The 8 bit/pixel image may also be smoothed and resampled to a lower spatial resolution 112, since for segmentation purposes, the supplied image is more detailed than necessary and lowering the spatial resolution greatly speeds up the processing. The breast image is identified as appertaining to a Left or Right breast 114, and then a first boundary pixel is determined 116 and this is used as a starting point for determining the breast boundary contour. If the image being analyzed represents a left breast, the attempt to identify the first boundary pixel starts from the right of the image and moves along a horizontal row towards the breast, and if the image is of a right breast, the scanning along the first horizontal row towards the breast starts at the left of the image and moves towards the right. The first boundary pixel is determined 116 by a process detailed hereinbelow with reference to FIG. 3. If the procedure 116 of FIG. 3 fails, the breast segmentation is determined as a failure 115, indicating something radically wrong with the image, due to the lack of exposure to x-rays, lack of a patient, etc., and the image is discarded.

Figure 4:
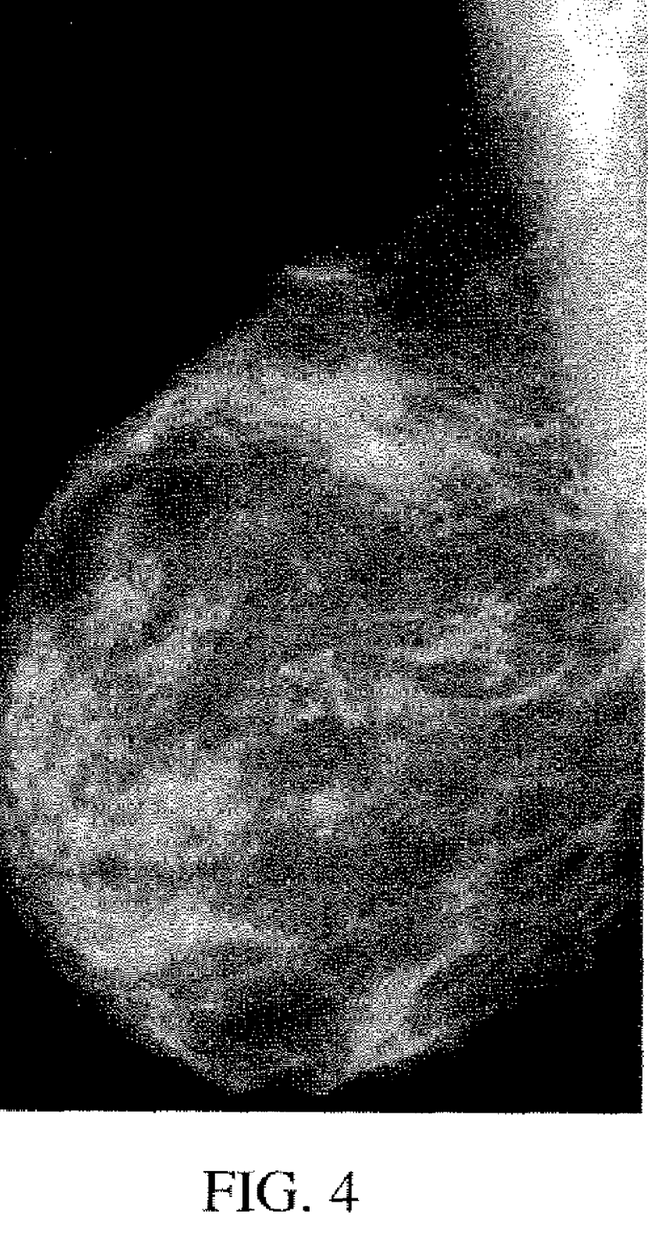
FIG. 4 shows a segmented image of a right breast; the surrounding tissue being removed for clarity.

The boundary (contour) around the lower 118 (FIG. 4) and upper 120 (FIG. 5) parts of the breast are now determined by a line-by-line method that is a particular feature of the invention, and, having roughly mapped out the boundary of both upper and lower parts of the breast, if previously resampled to a lower resolution (112), the image may be scaled back to the resolution of the original image and smoothed 122, typically by an iterative procedure. In this way, a list of contour points 124 at the resolution of the original image 102 (104) may be extracted, for use in marking out the boundary, i.e. segmentation, of the breast.

Preprocessing of DICOM Image

Figure 2:
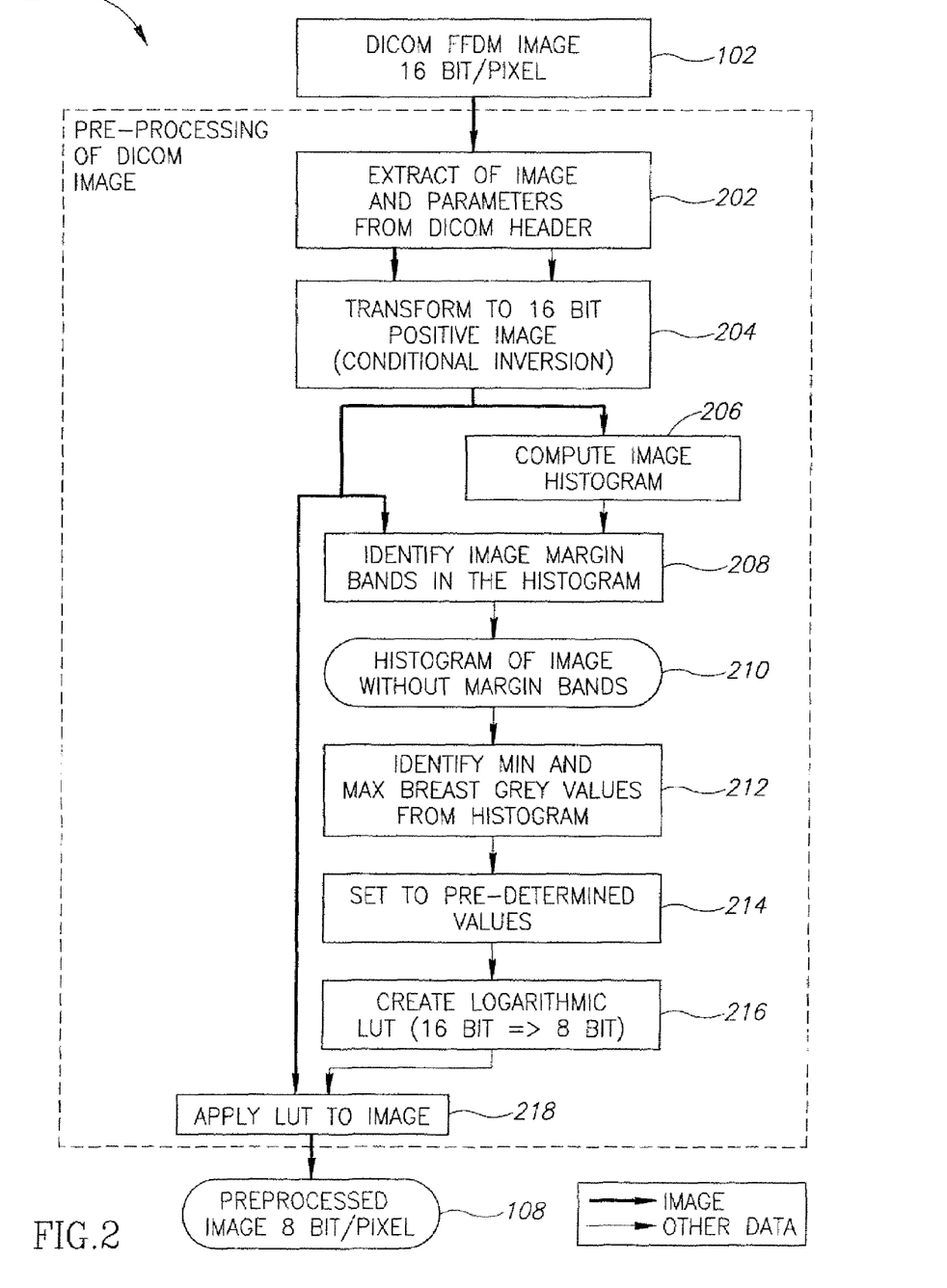
FIG. 2 shows a flowchart for the step of pre-processing a DICOM image discussed in conjunction with the process of FIG. 1.

With reference to FIG. 2, the preprocessing step 108 may be performed to a DICOM 16 bit/pixel picture 102 supplied, by a sub-procedure 200 as detailed hereinbelow.

Firstly, the image and its parameters are extracted from the DICOM header 202, and a conditional inversion 204 is made into a 16 bit positive image. An image histogram is now computed from the sampled image 206. If, as often happens, the DICOM image 102 has margins, that typically appear as a white frame therearound, these margin pixels are easily identified 208 via the intensity histogram and removed to give a histogram without margin bands 210 and a clean image. The most intense pixel and least intense pixel are identified from the clean image histogram 212 and the grey-scales of the least intense and most intense pixels are set to standardized minimum and maximum arbitrary values 214, thereby standardizing the images by normalizing the grayness to a physiological scale, and thus removing artifacts resulting from exposure times, radiation types etc. This normalizing transformation is particularly useful in that it enables the procedure described herein to be used on images coming to a technician from different systems, wildly different breast physiologies and different conditions.

Since x-ray absorption has a logarithmic relationship to the grayscale of the raw image, it is useful for the normalization to be performed via a logarithmic transformation. Thus at least for x-ray images of body tissues, a logarithmic Look-Up-Table (LUT) may be created 216 for transforming the grayscales of the pixels (16-bit positive image) to a lower resolution 8 bit image. The Look Up Table 216 is applied 218 to the image 204 to produce a preprocessed image 108.

Determination of the Boundary Point

Referring back to FIG. 1, a first boundary pixel of a feature is determined 116 on the preprocessed low resolution digital image 114 resulting from grey level determination 110 and resampling, and smoothing 112 the digital image identified The method used is essentially one of gradient analysis by first scanning a first line across the picture in a first direction from the outermost pixel of picture towards the feature and comparing grayscale variation in adjacent pixels until an intensity gradient (grayness variation) in a first sequence of adjacent pixels is detected as being above a predetermined threshold value and then confirming that the gradient across adjacent pixels indicates a first true boundary pixel of the feature by ascertaining that intensity gradients across subsequent pixels are less significant, thereby indicating that the boundary has indeed been traversed.

Figure 3:
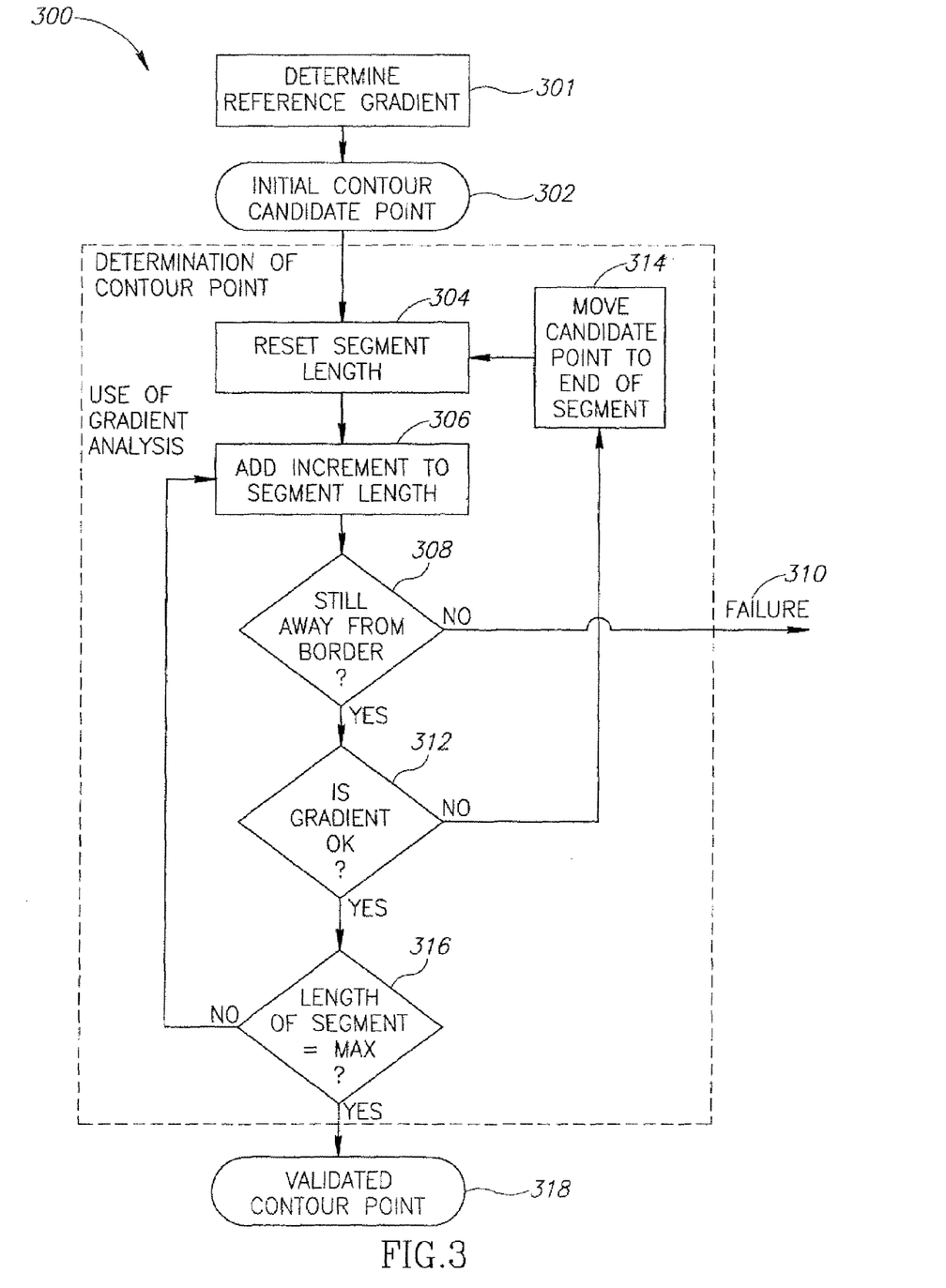
FIG. 3 shows a flowchart for the subroutine of determining a contour point used in conjunction with the embodiment of the present invention shown in FIG. 1.

Referring now to FIG. 3, in one embodiment, the process of determining boundary points by gradient analysis 300 comprises the following stages:
  i. determining a reference gradient 301;
  ii. setting an initial candidate (suspect) boundary point 302;
  iii. (re)setting segment length 304;
  iv. adding an increment to the segment length 306
  v. checking if the border of the image has been reached 308—if so, then the line across the picture has been scanned from side to side without determining a feature boundary and the procedure is considered as having failed 310.
  vi. If, however, the border of the image has not been reached, then a check is made to determine if the gradient is OK 312, i.e. within the reference gradient range indicating a boundary;
  vii. if the local gradient is not within the reference gradient range then
  viii. the boundary pixel is moved to the end of the line-segment 314 and steps (iii) to (v) i.e. 304-306, are repeated;
  ix. if the local gradient is within the reference gradient range 312 and the line segment length is below the maximum segment length 316 then the segment length is increased 306 and steps (iv) to (vi) are repeated;
  x. however, if the local gradient is within the reference gradient range 312 and the line segment length is not below the maximum segment length 316 then the boundary pixel is validated 318.

For increased accuracy, it will be noted that preferably, at each location, a local average grey scale intensity of the segment is used instead of the spot grey value of the pixel itself.

Generally, therefore, a horizontal (row) or vertical (column) line of pixels across the picture that roughly bisects the feature is selected, and it is scanned across until a suspected feature pixel is first encountered and then the suspected feature pixel is validated as being a boundary pixel. With breast segmentation images, the scanning is from side to side along a horizontal row across the breast image.

Iterative Identification of Neighboring Pixels

Having determined and validated a first boundary pixel of the feature to be segmented, since the boundary of the feature will be a closed loop, segmentation can proceed by iteratively examining the intensity shifts of a small segment of the line adjacent to the line first scanned in the region of the validated boundary point 318.

This may be achieved by iteratively repeating the following steps:
  (1) scanning next adjacent line in vicinity of the boundary pixel, and
  (2) determining the boundary pixel of the adjacent line by the pixel intensity gradient along the row
until a failure to find a predetermined threshold value occurs in which case
  (3) attempt scanning in an orthogonal direction by repeating steps (1) and (2). (As will be appreciated, for breast segmentation, where the first scanning is horizontally, the orthogonal direction is the vertical).
If the attempt to determine the adjacent pixel fails,
  (4) an appropriate position may be guessed, and the next row/column may then be examined, or the row may be skipped and the pixel in the next row determined by repeating steps (1) and (2), perhaps with the missed pixel being determined by interpolation.
After having completed the boundary determination of one side of the first line, by reaching the edge of the image (as with breast segmentation), or, having traced the edge of half the feature and one back to the initially scanned line,
  (5) repeating the procedure on the other side of the line until the boundary around the feature on the other side of the line is determined.

For determining the boundary pixels of many features, one simply starts at a first boundary pixel, say on a horizontal row across the feature and moves to the adjacent row, say above the first row and looks for the boundary pixel adjacent to the first validated boundary pixel. Having found that first pixel, one moves to the next adjacent row and continues until the uppermost boundary pixel is determined. Then one changes direction and comes back around the far side of the feature until one returns to the first row. Having returned to the first row, one may continue scanning rows below the first row to be scanned to close the loop.

Where, due to poor contrast, scanning horizontal rows proves unsuccessful, the scanning direction may be changed mid procedure to scan vertical rows. Indeed, this will frequently happen at extreme rows.

With breast segmentation, extraction of the breast tissue boundary is not easy. This will be apparent from examination of the typical segmented mediolateral oblique (MLO) breast image shown in FIG. 4, where an X-ray of a right breast is shown, where, for clarity, surrounding tissue has been cropped from the image. The shape of the breast is essentially bow shaped and one can determine boundary pixels row-by-row until towards the extremities, it is more effective to change direction and determine boundary pixels by moving column-by-column. Where the procedure fails, one can simply skip a row/column and look for a pixel in the next but one row/column. Where a next pixel is determined, but is further along the row/column than a predetermined maximum allowed separation distance, then the next pixel may be plotted at the maximum allowed separation. If the edge of the picture is reached, then the segmentation procedure for that section of the boundary (upper/lower part of breast) may be considered as complete.

Due to the presence of the pectoral muscle in mediolateral oblique (MLO) views which usually appears across the upper limit of the image, x-ray images of the female breast are asymmetrical about the horizontal. To speed up the processing and thus efficiency of the segmentation procedure, the criteria for switching the scan direction between row mode and column mode may be optimized slightly differently for the upper and lower parts of the picture.

Figure 5A:
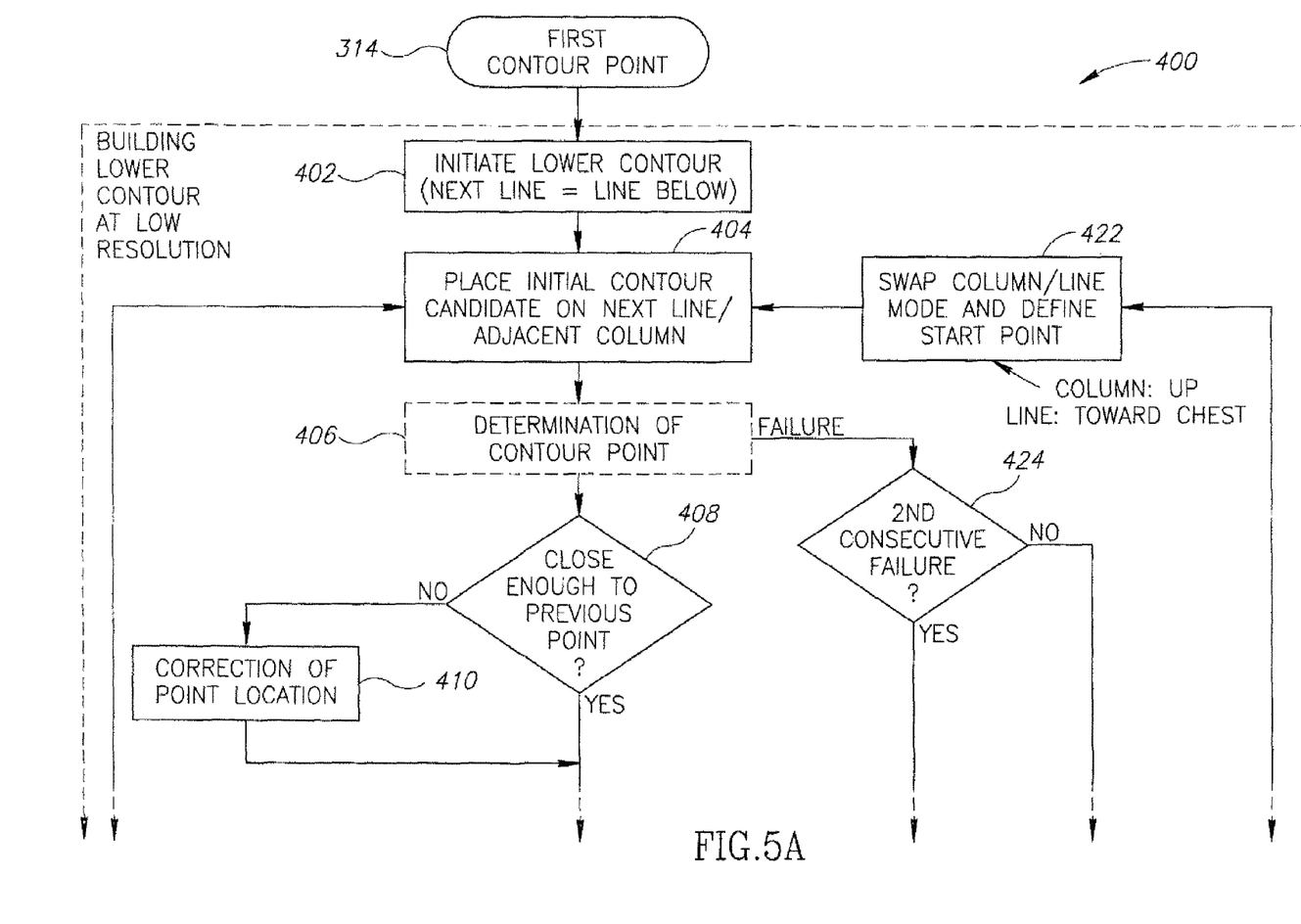
FIG. 5 shows a flowchart for building the lower part of the breast contour used in conjunction with the embodiment of the present invention shown in FIG. 1.
Figure 5B:
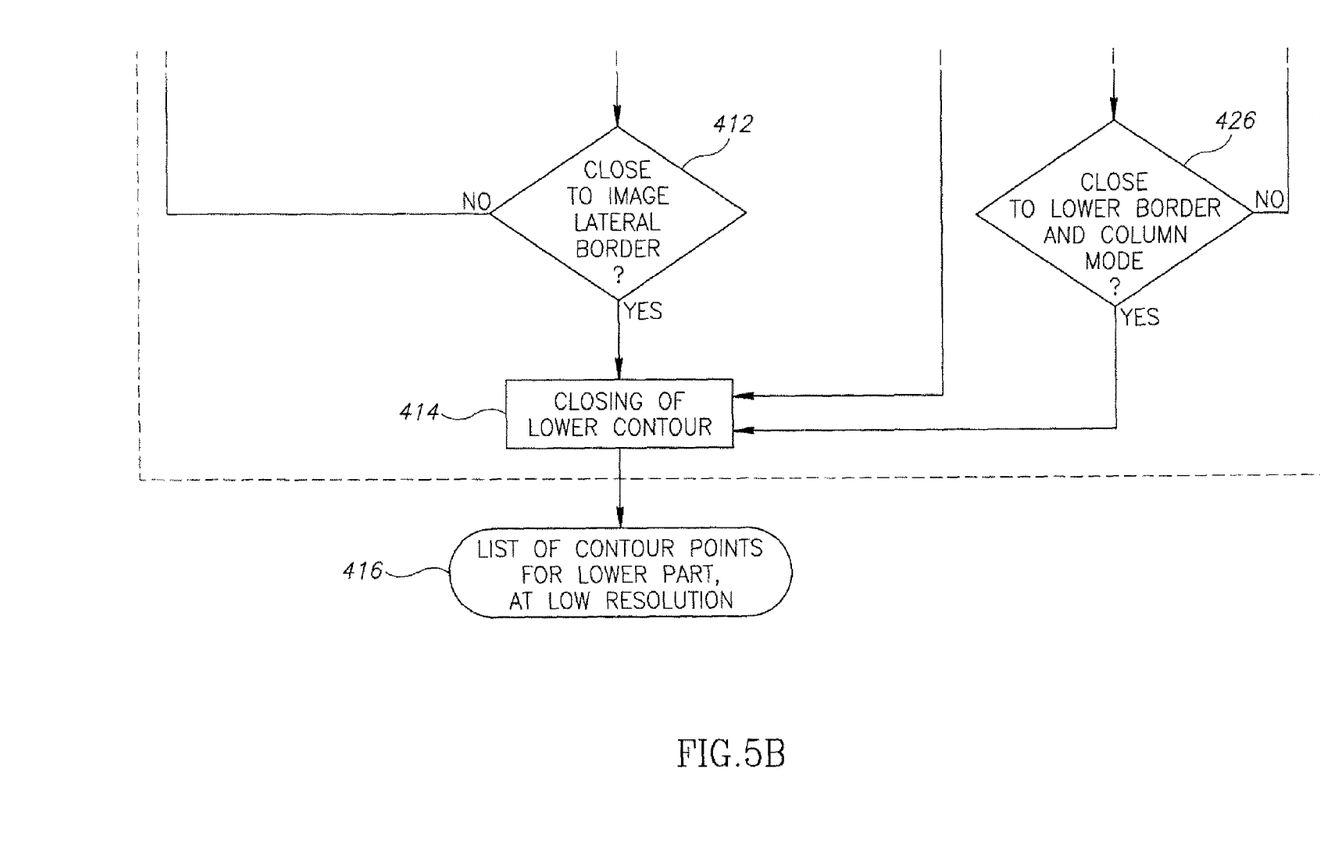

Thus for breast segmentation particularly, (but also perhaps for other applications presenting similar problems, such as lung lobe segmentation, for example) typically the boundary of the lower part and the upper part of the organ are separately segmented with slightly different, optimized procedures shown in FIGS. 5 and 6 as follows:

Thus with reference to FIG. 5, a procedure for segmenting the lower region of the breast is shown. Starting with the validated first boundary pixel 314, one first goes down a row 402, and hypothesizes a suggested boundary pixel on the adjacent line 404. Then one runs the procedure 406 for testing the validity of the suggested point 404. The procedure is essentially that of gradient comparison along a row, used to find an initial boundary pixel (300), mutatis mutandis.

If the pixel where the appropriate grayscale gradient is determined is close enough to the previous boundary point, essentially adjacent thereto 408, than it is accepted, and if not, the pixel location is corrected 410 to a maximum allowable displacement. The process then checks it the pixel is close to the lateral border of the picture 412. If so, the lower boundary of the breast is extended to the lateral border, closing the lower boundary 414. If the pixel is not close to the image lateral border, then the routine iteratively returns to the step of moving to the adjacent line 404 and runs the routine for determining the boundary pixel 406 again, and so on.

If the attempt to determine the contour point 406 fails, i.e. if no significant change in grayscale gradient along the row is determined, then there is an attempt to move from horizontal lines (rows) to vertical lines (columns) in this case, scanning upwards towards the top of the image 422 and the iterative procedure of guessing a boundary pixel 404 and confirming it 406 continues.

If the change in direction does not work, and there is a second consecutive failure then the lower contour is closed by an extrapolation technique 414. Likewise, if one is close to the image border in column mode 412, then the lower boundary may be closed 414. Having closed the boundary 414 around the lower part of the breast the list of contour points defining the boundary around the lower part of the breast is extracted 416. The list is in low resolution, but can be converted back to the original resolution and then smoothed by running an appropriate smoothing procedure.

Figure 6A:
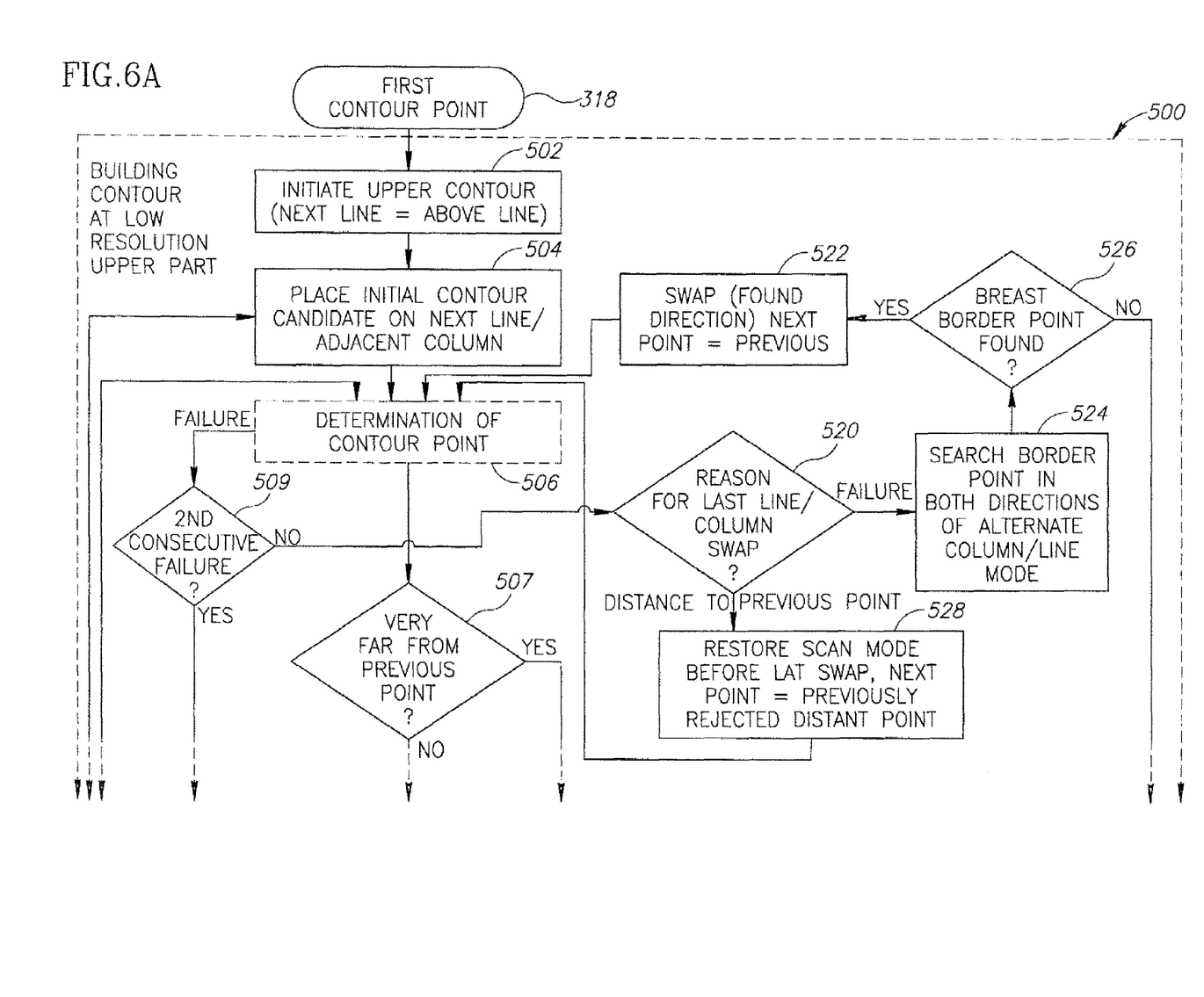
FIG. 6 shows a flowchart for building the upper part of the breast contour used in conjunction with the embodiment of the present invention shown in FIG. 1.
Figure 6B:
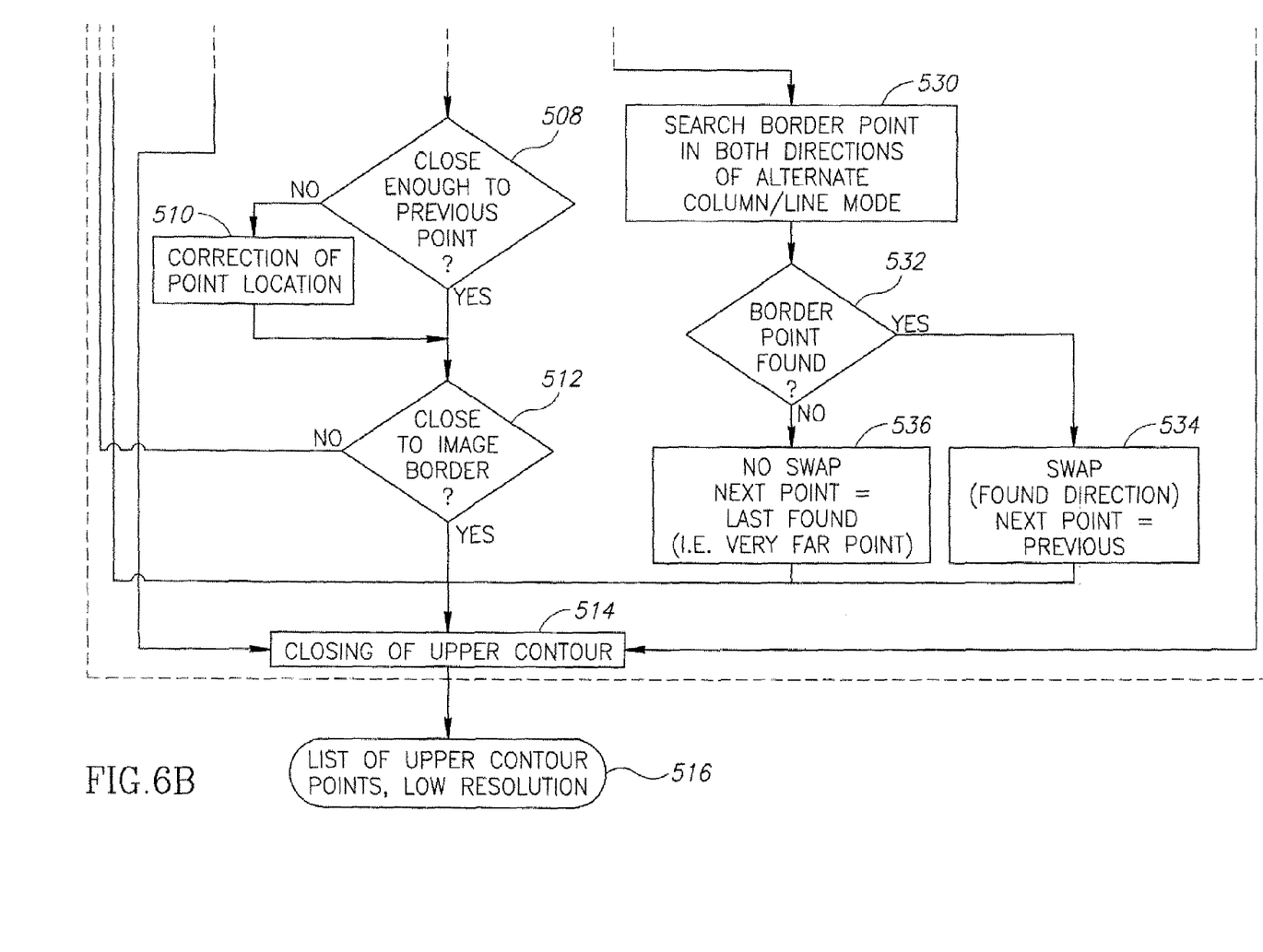

With reference to FIG. 6, taking into account the physiological difference of the upper part of the breast, due to the pectoral muscle, a slightly different subroutine 500 for mapping out the boundary around the upper part of the breast is employed. Once again, the procedure starts with the first boundary pixel 318 identified by the procedure 300. After initiating the subroutine for the upper part of the breast by going up a line 502 to the row above that in which the first identified boundary pixel 318 is found, and suggests a possible boundary pixel 504. Then the basic procedure for finding a subsequent boundary pixel 506, similar to procedure 300, mutatis mutandis, is run.

If the pixel determined as having a significant grayscale gradient from its neighbor is close enough (essentially adjacent) to the previous boundary point 508, it is validated. If the pixel is further away than a predetermined maximum allowed distance, the pixel location is corrected 510, the process then checks if the pixel is close to the image lateral border 512 and if so, closes the upper boundary 514 and the list of upper boundary points (low resolution) 516 is extracted. If the pixel is not close to the image lateral border 512, then the routine iteratively returns to the step of moving to the adjacent line 504 and runs the routine for determining the next boundary pixel 506 again, and so on. Thus far, the procedure for the boundary around the upper part of the breast 500 is identical to that for the lower part of the breast, mutatis mutandis. Indeed, if the attempt to determine the boundary point 506 fails. i.e. if there is no significant grayscale gradient, then once again there is an attempt to move from horizontal lines (rows) to vertical lines (columns) 520, however in this ease, the scanning is attempted both in the upward direction towards the top of the image and in the downward direction 524, towards the bottom of the image. If a border point is found 526, then the next point is set to the previous one 522 and the iterative procedure of confirming it 506 continues. If the reason for the previous line to column swap 520 was not a failure, the scan mode before the last swap is restored, setting the next point to the previously rejected distant point 528 and the basic boundary point determination 506 is again run. If, however, the change in direction does not work, and there is a second consecutive failure 509 then the lower contour is closed by an extrapolation technique 514.

In a further optimized algorithm for the upper breast boundary determination, after the basic determination of boundary point routine 506 and before querying if the pixel determined is close enough to the previous point 508, an additional query of whether the point is very far from the previous point 507 may be asked. If the answer is negative, then the close enough to the previous point 508 is asked. However, if the point is indeed very far from the previous point, then the boundary point is searched for in both directions, whilst switching from rows to columns and back 530. If the border point is found 532, then the next point is swapped with the previous point 534 and the determination of the boundary point subroutine is rerun 506. If, however, no border point is found 532, then the next point is set to the last found point 536 and the determination of boundary point subroutine is rerun. This additional procedure is helpful in overcoming the effects of the pectoral muscle on the breast tissue image.

It will be noted that in contradistinction to prior art methods, the basic algorithm described hereinabove, and the detailed variations for segmentation of the upper and lower part of the breast enable the obtaining of consecutive boundary (contour) points of the breast directly and do not require any a priori definition of a coarse contour and it does not require any a posteriori corrections.

It will be appreciated by those skilled in the art, that the methods for segmentation described hereinabove may be used when segmenting images of other organs and tissue types, from heir image backgrounds, and will find general usage in image processing, for non-biological applications as well. This is true regardless of the modalities used.

Tissue other than breast tissue that may be imaged and segmented using the basic method described above, include lung, brain, colon and bone tissue, for example. The methods discussed herein may be applied to these and other tissue types, with little or no modification.

Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method of determining boundary pixels of a feature in a digital picture provided to a computer, the digital picture being a medical image and comprising a two dimensional orthogonal array of lines of adjacent pixels, the method comprising the steps of:
   (b) scanning a first line across the picture in a first direction from an outermost pixel of the picture towards the feature and calculating grayscale gradient across adjacent pixels until a significant gradient is determined;
   (c) confirming that the variation in grayscale gradient across adjacent pixels indicates a first true boundary pixel of the feature by ascertaining that grayscale gradient across subsequent pixels in a series of several pixels along the line is still significant;
   (d) iteratively repeating the steps (v) to (vi) of:
   (v) scanning next adjacent line in vicinity of said boundary pixel, and
   (vi) determining the boundary pixel of the adjacent tine by assessing the significance of grayscale intensity gradient along the row until, a failure to find a subsequent pixel occurs in which case;
   (vii) attempt scanning in an orthogonal direction by repeating steps (v) and (vi), and, if attempt fails, extrapolating to edge of image or to first line, until having determined the boundary around the feature to one side of the first line;
   (e) repeating step (d) on other side of the line until the boundary around the feature on the other side of the line is determined.

2. The method of claim 1, said digital image being a monochrome image.

3. The method of claim 2 further comprising the preliminary step (a) of preprocessing by normalizing intensities of all pixels in the picture.

4. The method of claim 3 wherein said normalizing comprises the sub-steps of:
   (i) removing frame;
   (ii) setting brightest pixel in picture to a maximum intensity value of a simplified scale;
   (iii) setting dullest pixel to a background intensity value of the simplified scale, and
   (iv) converting intensities of intermediate intensity pixels to intermediate values of the simplified scale.

5. The method of claim 3 wherein the preliminary step (a) of preprocessing comprises normalizing intensities via a logarithmic scale.

6. The method of claim 5 wherein the preliminary step (a) of preprocessing comprises the steps of:
   i. sampling the digital picture with an integer coefficient to produce a sampled image having a reduced resolution;
   ii. computing a raw image histogram from the sampled image;
   iii. where digital image is framed, identifying and removing frame from the sampled image to produce a clean image;
   iv. selecting most intense pixel and least intense pixel from said clean image histogram;
   v. setting grey-scales of least intense and most intense pixels to standardized minimum and maximum arbitrary values;
   vi. creating a look-up-table (LUT) for transforming grayscales of pixels with intermediate intensities by calculating a logarithmic scale between said maximum and minimum intensities;
   vii. applying said LUT to the clean image to produce a normalized image.

7. The method of claim 6 wherein said sampled image is a 16-bit positive image and said LUT converts the sampled image into an 8 bit image.

8. The method of claim 1 wherein step (c) of confirming that the variation in adjacent pixels indicates a first true boundary pixel of the feature by the steps of:
   i. determining a reference gradient range;
   ii. determining a minimum and a maximum line segment length;
   iii. setting line segment to its minimum length
   iv. calculating local average of grayscale values at each pixel within the line segment adjacent to said border pixel;
   v. calculating the local grayscale gradient at said boundary pixel; such that
   vi. if the local gradient is not within the reference gradient range then the boundary pixel is moved to the end of the line-segment and steps iii, iv and v are repeated;
   vii. if the local gradient is within the reference gradient range and the line segment length is below the maximum segment length, then the segment length is increased and steps (iv) and (v) are repeated;
   viii. if the local gradient is within the reference gradient range and the line segment length is not below the maximum segment length then the boundary pixel is validated.

9. The method of claim 1 further comprising the step (f) of restoring the original resolution of the digital picture and smoothing the border of the feature.

10. The method of claim 1 wherein said digital image is an X-ray photograph.

11. The method of claim 1 wherein said feature is a body tissue.

12. The method of claim 11 wherein said body tissue is selected from the list comprising breast, lung, brain, colon and bone tissue.

13. The method of claim 1 wherein said feature is a breast and said method of determining border pixels is for segmenting the breast from surrounding tissue.

14. The method of claim 13 wherein said line is a row of adjacent pixels across the breast image from side to side and said orthogonal direction is a column of adjacent pixels perpendicular to the row.

15. The method of claim 1, said method further includes a step (a) of preprocessing to standardize presentation of the image wherein said step of preprocessing includes creating a logarithmic look-up table that is then applied for obtaining an image reflecting the dynamics of energy absorption.

16. A system for mammography comprising:
an XRAY source;
a means of obtaining a digitalized X-Ray image of part of a female torso as a binary array;
a computer configured to segmentize the digitalized image, wherein the image is a medical image, and identify pixels corresponding to border of a breast by a method comprising the steps of:
(b) scanning a first horizontal row across the picture in a first direction from outermost pixel of picture towards the breast and calculating grayscale gradient across adjacent pixels until a gradient is detected as being significant;
(c) confirming that the variation in adjacent pixels indicates a first true boundary pixel of the feature by ascertaining that grayscale gradient across subsequent pixels in series of several pixels along the line still significant;
(d) iteratively repeating the steps (v) to (vii) of:
(v) scanning next row in vicinity of said boundary pixel, and
(vi) determining the boundary pixel of the adjacent row by assessing significant pixel intensity gradient along the row until a failure to find a predetermined significant gradient occurs in which case;
(vii) attempt scanning vertically by repeating steps (v) and (vi) until the edge of picture is reached having segmentized the breast to one side of the first line, and
(e) repeating step (d) on other side of the first row.

17. The system of claim 16 wherein the method comprises a preliminary step (a) of normalizing the image by the sub-steps of:
(i) removing any frame;
(ii) setting brightest pixel in picture to a maximum intensity value of a simplified scale;
(ii) setting dullest pixel to a background intensity value of the simplified scale, and
(iv) convening intensities of intermediate intensity pixels to intermediate values of the simplified scale.

18. The system of claim 16 further comprising the step (f) of restoring original resolution of the image and smoothing the boundary of the feature.

19. A method of extracting a boundary surrounding a feature from a monochrome digital image, wherein the image is a medical image, comprising a two dimensional array of pixels, the method comprising the steps of:
(ii) scanning along a line of pixels in a first direction across the image from the outside edge of image towards the feature until a significant grayscale gradient occurs across a number of adjacent pixels;
(iii) ascertaining that the gradient indicates a true boundary pixel by evaluating the gradient across subsequent pixels;
(iv) identifying boundary pixels in an adjacent line by scanning grayscale intensity across pixels bordering the first boundary pixel;
(v) iteratively scanning next adjacent line to identify adjacent boundary pixels until technique fails;
(vi) rotating scanning direction to a direction orthogonal to the first direction;
(vii) repeating steps (ii) to (vi) until the first boundary pixel is reached after tracing a closed loop enclosing the feature or an edge of the image is reached.

20. The method of claim 19 further comprising a preliminary step (i) of normalizing the image by the sub-steps of:
(a) removing any frame;
(b) setting brightest pixel in picture to a maximum intensity value of a simplified scale;
(c) setting dullest pixel to a background intensity value of the simplified scale, and
(d) converting intensities of intermediate intensity pixels to intermediate values of the simplified scale.

21. The method of claim 19 comprising a subsequent step (viii) of restoring original resolution of the digital picture and smoothing the boundary of the feature.

22. A method for preprocessing a raw digital image using a computer, wherein the image is a medical image, for subsequent segmentation of a feature therein comprising the steps of:
(i) removing any frame;
(ii) setting brightest pixel in picture to a maximum intensity value of a simplified scale;
(iii) setting dullest pixel to a background intensity value of the simplified scale;
(iv) converting intensities of intermediate intensity pixels to intermediate values of the simplified scale;
(v) sampling the digital picture with an integer coefficient to produce a sampled image having a reduced resolution;
(vi) computing a raw image histogram from the sampled image;
(vii) where digital image is framed, identifying and removing frame from the sampled image to produce a clean image;
(viii) selecting most intense pixel and least intense pixel from said clean image histogram;
(ix) setting grey-scales of least intense and most intense pixels to standardized minimum and maximum arbitrary values;
(x) creating a look-up-table (LUT) for transforming gray-scales of pixels with intermediate intensities by calculating a logarithmic scale between said maximum and minimum intensities; and
(xi) applying said LUT to the clean image to produce a normalized image.

23. The method of claim 22 wherein said sampled image is a 16-bit positive image and said LUT converts the sampled image into an 8 bit image.

24. A method of confirming that the variation in grey level intensity of a suspected boundary pixel of a feature in an axial line across digital image is a true boundary pixel of the feature comprising the steps of:
i. determining a reference gradient range;
ii. determining a minimum and a maximum line segment length;
iii. scanning along the line towards feature;
iv. setting line segment to its minimum length
v. calculating a local average of grayscale values about each pixel by averaging grayscale intensities of a line segment prior to and adjacent the pixel;
vi. calculating the local grayscale gradient at the boundary pixel; such that
vii. if the local gradient is not within the reference gradient range then the suspected boundary pixel is moved to the end of the line-segment and steps iv, v and vi are repeated;
viii. if the local gradient is within the reference gradient range and the line segment length is below the maximum segment length, then the segment length is increased and steps (v) and (vi) are repeated, and
ix. if the local gradient is within the reference gradient range and the line segment length is not below the maximum segment length then the suspected boundary pixel is validated as being a true boundary pixel.

* * * * *